May 8, 1956  N. E. L. MEANS  2,744,519
ANTI-SPLASH UNIT FOR COOKING PANS
Filed July 5, 1952

INVENTOR.
NORMAN E. L. MEANS
BY
Kenway, Jenney, Witter & Hildreth
ATTORNEYS

United States Patent Office 2,744,519
Patented May 8, 1956

2,744,519
ANTI-SPLASH UNIT FOR COOKING PANS
Norman E. L. Means, Missoula, Mont.

Application July 5, 1952, Serial No. 297,381

4 Claims. (Cl. 126—299)

This invention relates to a novel anti-splash unit for cooking pans, especially frying pans. It is well known that the frying of fish and other edibles in grease results in a considerable splash from the pan and the splashing is most objectionable as it spatters onto and soils the stove and adjacent walls. Metal barriers have been proposed for catching the splash but the splashed grease runs down these barriers onto the stove. My invention employs a supporting barrier together with a removable sheet of absorbent paper disposed to catch and absorb the grease splashes, thus eliminating the objectionable splash damage.

In its preferred form my invention embodies a plurality of flat panels pivotally joined at their adjacent margins and provided with marginal channels for receiving and supporting the two margins of a strip of paper resting on one face of the panels between the channels. The panels can be made of any suitable material and their pivotal connections permit disposition of the unit closely adjacent to and about the cooking pan with the paper in position to catch the splashings. It is proposed that the paper employed will be standard paper toweling which can be removed from the unit and disposed of after each frying operation. The production of a novel anti-splash unit of this nature and for the purpose described comprises the primary object of the invention.

These and other features of the invention will be more readily understood and appreciated from the following detailed description of preferred embodiments thereof selected for purposes of illustration and shown in the accompanying drawing in which—

Figure 3:
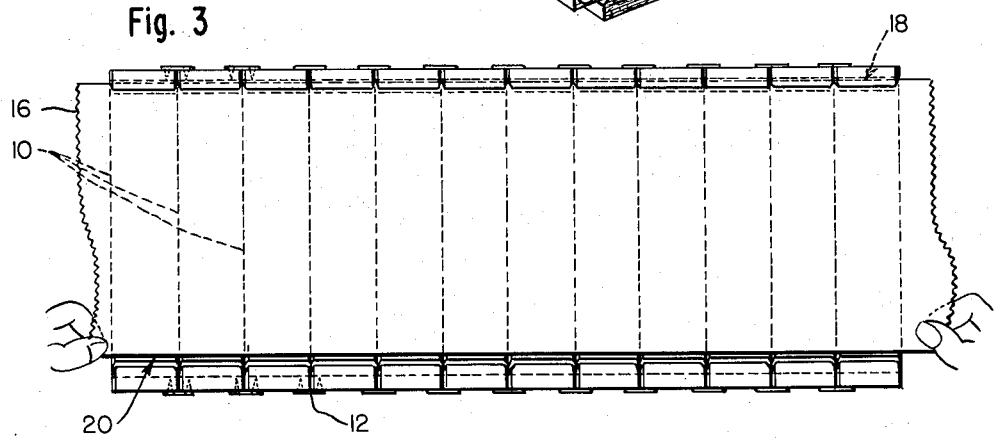
Fig. 3 is a plan view illustrating the unit spread out flat on a support and the paper sheet being applied thereto.
Figure 4:
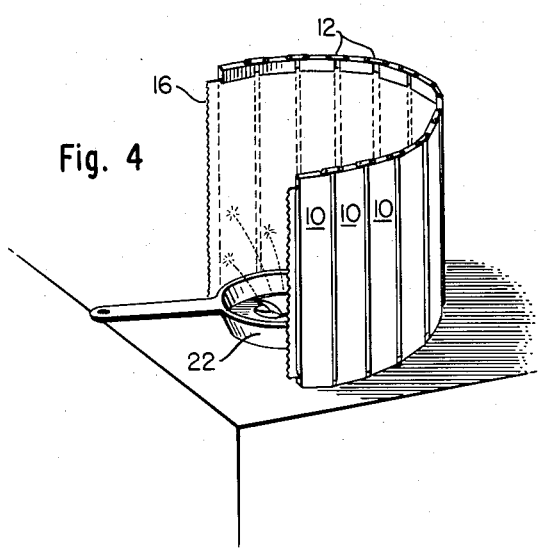
Fig. 4 illustrates the unit in use about a frying pan.

The supporting barrier will be longitudinally flexible so that it can be placed flat on a support while the absorbent paper sheet is being applied (Fig. 3) and can thereafter be disposed arcuately in upright position on one margin about the pan with the paper in position to catch the splash from the pan, as illustrated in Fig. 4. While the supporting barrier can be made of various materials such as wood, plastic, wire, etc., and in various forms and the paper can be secured thereto as by thumb tacks and the like, I prefer to make the barrier of jointed flat panels and provide channels therein to conveniently receive and support the paper, all as hereinafter described.

Referring first to Figs. 1–4 of the drawing, 10 illustrates a plurality of flat panels formed from waterproof plywood and pivotally joined at their margins as by links 12. Saw cuts 14 are made in the panels to provide two channels at one face of the combined panels and disposed respectively along the two longitudinal margins of the unit for receiving and supporting the two margins of a strip of absorbent toweling paper 16. When the panels are placed flat on a table one margin of the paper strip can first be inserted in one channel at 18 and the other margin then inserted in the other channel at 20 as illustrated in Fig. 3. The unit can then be placed about the pan 22 as illustrated in Fig. 4. When the frying is completed the unit can again be placed flat on the table and the soiled strip 16 removed.

Figure 1:
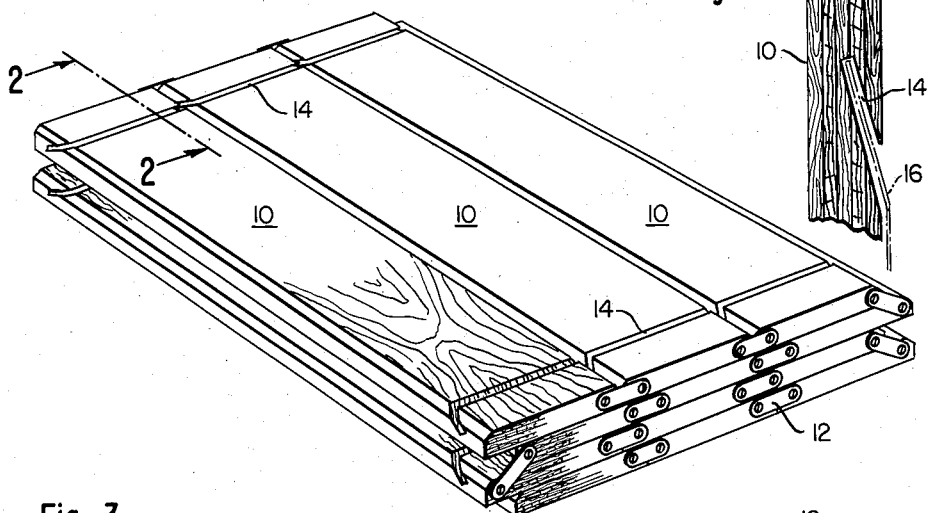
Fig. 1 is a perspective view of a unit embodying one form of the invention.
Figure 2:
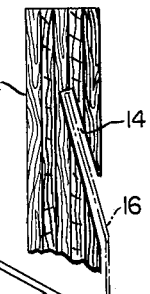
Fig. 2 is an enlarged fragmentary sectional view taken on line 2—2 of Fig. 1.

The rear face of the panels 10 can also be used as a cutting board for bread, salad vegetables, meat patties, etc., either fully extended or folded as illustrated in Fig. 1. Also when constructed of waterproof plywood or plastic material the panels can be washed after each use. It is proposed that the channels shall be so spaced as to accommodate the standard paper toweling commonly on sale in rolls.

Figures 5, 6:
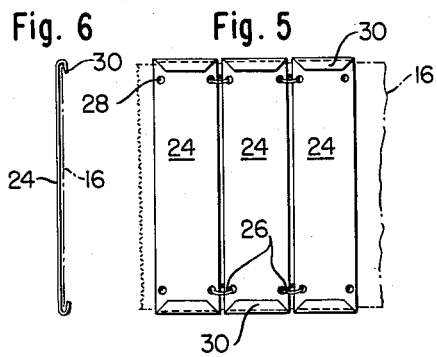
Fig. 5 is a fragmentary view of another form of the invention.
Fig. 6 is an end view of Fig. 5.

In Figs. 5 and 6 I have illustrated panels 24 of metal, plastic or other suitable material and pivotally joined at their adjacent margins as by rings 26 extending through punched holes 28. The ends 30 of the panels are bent over U-shape to provide paper receiving channels thereunder.

It will now be apparent that I have produced an anti-splash unit that wholly eliminates the splash damage and traps the splashes by absorption in the paper strip which can be disposed of after each frying operation. The toweling is a relatively cheap and standard product and the barrier unit will serve its function indefinitely.

Having thus disclosed my invention what I claim as new and desire to secure by Letters Patent is:

1. An anti-splash unit for cooking pans, comprising a rectangular and longitudinally flexible member adapted to lie flat on a horizontal support and to be flexed to arcuate form, means providing two opposed open channels at one face of the member and disposed respectively along the two longitudinal margins thereof, and a strip of absorbent paper supported at two opposite margins in said channels and resting on said face between the channels, the member in arcuate form being adapted to stand upright on one of said margins about a cooking pan with said paper facing the pan in position to receive and absorb splashings therefrom, the member being adapted to permit removal of the used paper strip and replacement with a fresh strip in a straight path longitudinally of said channels when positioned flat on said horizontal surface with said face disposed upwardly.

2. The anti-splash unit defined in claim 1 in which said member comprises a plurality of flat panels pivotally joined at their adjacent margins.

3. The anti-splash unit defined in claim 1 in which said member comprises a plurality of flat wood panels pivotally joined at their adjacent margins and in which said channels comprise inwardly facing saw cuts in the panels.

4. The anti-splash unit defined in claim 1 in which said member comprises a plurality of flat panels pivotally joined at their adjacent margins and in which end portions of the panels extend in a U-shape over said face and provide said channels.

References Cited in the file of this patent
UNITED STATES PATENTS

| | | |
|---|---|---|
| 1,735,806 | Struble | Nov. 12, 1929 |
| 1,764,954 | Hentschel | June 17, 1930 |
| 2,324,398 | Kahr | July 13, 1943 |
| 2,525,683 | Keely | Oct. 10, 1950 |
| 2,561,206 | Kaspar | July 17, 1951 |
| 2,563,078 | Silberman | Aug. 7, 1951 |
| 2,565,905 | Belau | Aug. 28, 1951 |
| 2,568,637 | Jardim | Sept. 18, 1951 |
| 2,587,773 | Sell | Mar. 4, 1952 |
| 2,591,786 | Cronheim | Apr. 8, 1952 |

FOREIGN PATENTS

| | | |
|---|---|---|
| 584,722 | Germany | Sept. 23, 1933 |